(12) United States Patent
Toebes et al.

(10) Patent No.: US 7,440,971 B2
(45) Date of Patent: Oct. 21, 2008

(54) CONTEXT BASED ACCESS OF FILES BY FILE SYSTEM TO A CLIENT BASED ON DETECTION OF RELATED FILES OPENED BY THE CLIENT

(75) Inventors: John Toebes, Cary, NC (US); Bryan C. Turner, Apex, NC (US); Douglas Jay Walker, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 315 days.

(21) Appl. No.: 11/067,624

(22) Filed: Feb. 28, 2005

(65) Prior Publication Data

US 2006/0195490 A1    Aug. 31, 2006

(51) Int. Cl.
G06F 17/30 (2006.01)
(52) U.S. Cl. .................................. 707/103 R; 707/203
(58) Field of Classification Search ................. 707/203; 717/120, 103
See application file for complete search history.

(56) References Cited

U.S. PATENT DOCUMENTS

| | | | |
|---|---|---|---|
| 6,185,734 B1 * | 2/2001 | Saboff et al. ................. | 717/164 |
| 7,203,871 B2 | 4/2007 | Turner et al. | |
| 2004/0205716 A1 * | 10/2004 | Abdel-Rahman et al. ... | 717/120 |
| 2004/0216089 A1 * | 10/2004 | Kaler et al. .................. | 717/120 |
| 2004/0230968 A1 * | 11/2004 | Masunaga et al. ........... | 717/171 |
| 2004/0243975 A1 * | 12/2004 | Krueger et al. .............. | 717/106 |
| 2005/0210461 A1 * | 9/2005 | Srivastava et al. ........... | 717/170 |
| 2006/0179037 A1 | 8/2006 | Turner et al. | |
| 2006/0179106 A1 | 8/2006 | Turner et al. | |

OTHER PUBLICATIONS

Menon et al., "IBM Storage Tank—A heterogenous scalable SAN file system", *IBM Systems Journal*, 2003, pp. 250-267, vol. 42, No. 2, IBM.
Soules e tal., "Metadata Efficiency in Versioning File Systems", 2nd *USENIX Conference on File and Storage Technologies*, San Francisco, CA, Mar. 31-Apr. 2, 2003, pp. 1-16.
Griffioen et al., "The Design, Implementation, and Evaluation of a Predictive Caching File System", Technical Report No. CS-264-96, Department of Computer Science, University of Kentucky, Lexington, Kentucky, Jun. 30, 1996, pp. 1-33.

(Continued)

*Primary Examiner*—John E Breene
*Assistant Examiner*—Dennis Myint
(74) *Attorney, Agent, or Firm*—Leon R. Turkevich

(57) ABSTRACT

A network has a file system configured for providing a selected version of a first file to a client, having requested the file, based on detecting that the client has opened a second file having an identified relationship with the first file. Files are identified as having a relationship based on membership in a file group, wherein each file group identifies only one version of each file specified in the corresponding file group; hence, multiple file groups can identify files associated with respective versions of a file set. In response to determining the first file belongs to a file group, the file system identifies the version of the second file opened by the client, and selects the version of the first file to be provided to the client based on determining the file group associated with the version of the second file opened by the client.

25 Claims, 3 Drawing Sheets

OTHER PUBLICATIONS

Cornell et al., "Wayback: A User-level Versioning File System for Linux", Proceedings of the FREENIX Track: 2004 USENIX Annual Technical Conference, Boston, MA, Jun. 27-Jul. 2, 2004, The USENIX Association (10 pages).

* cited by examiner

CONTEXT BASED ACCESS OF FILES BY FILE SYSTEM TO A CLIENT BASED ON DETECTION OF RELATED FILES OPENED BY THE CLIENT

BACKGROUND OF THE INVENTION

1. Field of the Invention

The present invention relates to updating of files on a file system. More particularly, the present invention relates to distribution of updated files of a file group, via a file system, to users of the file group in a manner that ensures that the updating does not interfere with access by users of prior versions of the files of a preexisting file group. For example, the present invention encompasses providing software updates to users in a manner that avoids any conflict between the software updates and prior software versions.

2. Description of the Related Art

The availability of files to end users in a network encounters increasing complexity when different versions of the files are created. Unlike the relatively simple case of providing users with unique files having distinct names, the presence of different versions introduces difficulties in ensuring that the appropriate version is delivered to the user. File systems, referred to as "versioning file systems", have been developed that track different versions of a given file. As described below, however, such versioning file systems are insufficient for more complex file interactions, namely managing distribution of related files within a file group, where coordination is required between the multiple files within the file group to avoid inconsistencies.

One example of managing related files within a file group involves dissemination of executable software to end users. Traditional techniques for sending software to users can be categorized as one of three methods: (1) install on demand, (2) executing software from a network mapped drive, and (3) pushed package install. The technique of install on demand involves copying an executable software file from a server to the user's computer each time the user wishes to execute the program, for example in the form of a web based ActiveX control. The install on demand technique also has been referred to as "install from the Web", or "just in time installation", etc.

A fundamental aspect of the install on demand technique is that the executable software file always is downloaded from a remote site and executed automatically on the user's computer; if the executable software instance is terminated, the operating system of the user's computer is unable to restart the previously downloaded software file, hence a second instance of the executable software can only be initiated by repeating the process of downloading the executable software from the remote site. Hence, the install on demand technique has the advantage that software can be updated at any time after the user has received the software, without affecting existing software execution. In addition, the software update can be completed simply by replacing the original software, stored on the server, with a new version. However, an inherent problem with the install on demand technique is that the necessity for downloading the executable software file for each instantiation of the software requires that the size of the executable software file be limited to a relatively small size to prevent excessive delays that would otherwise be encountered in downloading large executable files.

Use of a network mapped drive to provide software to users involves storing the executable software on a network mapped drive that is available to the users of a network, for example a shared file server in a local area network. Each time a client computer attempts to execute the software, the client computer executes the executable software that is stored on the network mapped drive, resulting in an open connection between the client computer and the server that persists for the duration of the instance of the executable software (i.e., the application instance). Use of the network mapped drive has the advantage of being stored statically on the shared file server, eliminating concerns that the executable software needs to be limited to a small size for optimized downloading; rather, the size of the executable software is not limited as in the case of the install on demand technique. In addition, the executable software can be updated by replacing the single copy of the prior executable software with the newer version, but only if no users are currently executing the software stored on the network mapped drive.

In particular, if any user is accessing the executable software on the network mapped drive, a lock is imposed on the file during software execution to ensure that the file is not deleted or modified during the existence of the open connection between the client computer and the server. Hence, network administrators need to notify all users to terminate execution of the software before the updated software can be added to the network, else a system crash will be encountered. In addition, any loss of connectivity between the client computer and the server that stores the executable software will result in a premature termination of the open connection, causing a crash of the executable instance of the software. In addition, if an optional component of the executable software file (e.g., a dynamically linked library (DLL)) is updated, the executable software file still may crash upon execution due to an incompatibility between the existing executable software file and the updated component.

The pushed package install technique involves delivering the executable software file to the user computer via some installation mechanism (e.g., accessing a download resource by selecting a hyperlink on a website or in an e-mail, compact disc, downloading installation software, etc.), causing the installation ("pulling") of the executable software file onto the user computer. Hence, the installed software does not have any size limitation as encountered in the install on demand technique, and does not require connectivity with a server as required using the network mapped drive technique. In addition, the executable software file may be configured for checking for updates upon startup, which may result in an updated file being downloaded and installed onto the user computer. Hence, each user computer is responsible for updating its version of the executable software. Consequently, a fundamental problem with the pushed package install technique is that a software developer is unable to ensure that all users have the most up-to-date version of the software.

Hence, the distribution of software according to the above-identified techniques has numerous tradeoffs that limit the availability to provide the most up-to-date software to all users, regardless of the size of the software files. In addition, the existing versioning file systems are not designed to handle multiple related files; hence, inconsistencies may arise if different versions of a file link to a referenced file having a different version, for example in the case of linked spreadsheets or the like.

SUMMARY OF THE INVENTION

There is a need for an arrangement that enables coordinated access between a group of related files (i.e., a file group), each file of the file group having at least one version, to ensure that clients obtain access to consistent versions of files that are associated with each other in the file group.

There also is a need for an arrangement that enables software to be provided to clients in a manner that guarantees that a client can always obtain the most recent available file(s) for local execution of the received files during each initiation of an executable software instance; further, there is a need that this arrangement also enables the software to be updated at any time without adversely affecting any clients currently executing prior versions of the software, and without concerns of file sizes.

These and other needs are attained by the present invention, where a network has a file system configured for providing a selected version of a first file to a client, having requested the file, based on detecting that the client has opened a second file having an identified relationship with the first file. Files are identified as having a relationship based on membership in a file group, wherein each file group identifies only one version of each file specified in the corresponding file group; hence, multiple file groups can identify files associated with respective versions of a file set. In response to determining the first file belongs to a file group, the file system identifies the version of the second file opened by the client, and selects the version of the first file to be provided to the client based on determining the file group associated with the version of the second file opened by the client.

Hence, multiple versions of a file set (e.g., a collection of files used to provide a collection of data or an executable application service) can be identified by respective file groups, enabling efficient identification and management of multiple versions of a file set by a file system, where each version utilizes new files, or different versions of existing files. Moreover, the use of file groups enables the file system to instantaneously distribute new versions of a file set, without disrupting existing services provided to clients having already opened a prior version of the file set.

One aspect of the present invention provides a method in a network having a file system. The method includes receiving by the file system a request for a first file from a client; and determining by the file system whether the client has opened a second file having an identified relationship with the first file. The method also includes selectively determining by the file system a version of the second file opened by the client, based on determining the client has opened the second file, and selectively identifying by the file system one of a plurality of file groups that identifies the determined version of the second file. Each file group identifies only one version of each file specified in the corresponding file group, and the files identified by said each file group have an identified relationship relative to a corresponding version of a file set. The method also includes selectively sending to the client by the file system a version of the first file having been identified in the one identified file group, in response to the request and based on determining the client has opened set second file having said identified relationship with the first file. The determining of whether the client has opened a second file having an identified relationship with the first file enables the file system to identify whether the most appropriate version (e.g., based on locality, client classification, most recent version, etc.) of the first file can be sent to the client, or whether a version of the first file must be matched with the second file based on shared membership within a file group (e.g., a particular version of an executable application having application components). Hence, delivery of version-based files can be optimized for clients while ensuring compatibility with files already in use by the clients.

Another aspect of the present invention provides a network. The network includes a storage medium configured for storing a plurality of files, at least one of the files having a plurality of versions. The network also includes a file system configured for receiving a request for a first file from a client. The file system configured for responding to the request based on: (1) determining whether the client has opened a second file having an identified relationship with the first file, and in response determining a version of the second file opened by the client, based on determining the client has opened the second file, and (2) identifying one of a plurality of file groups that identifies the determined version of the second file. Each file group identifies only one version of each file specified in the corresponding file group, the files identified by said each file group having an identified relationship relative to a corresponding version of a file set. The file system sends to the client as said response a version of the first file having been identified in the one identified file group.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
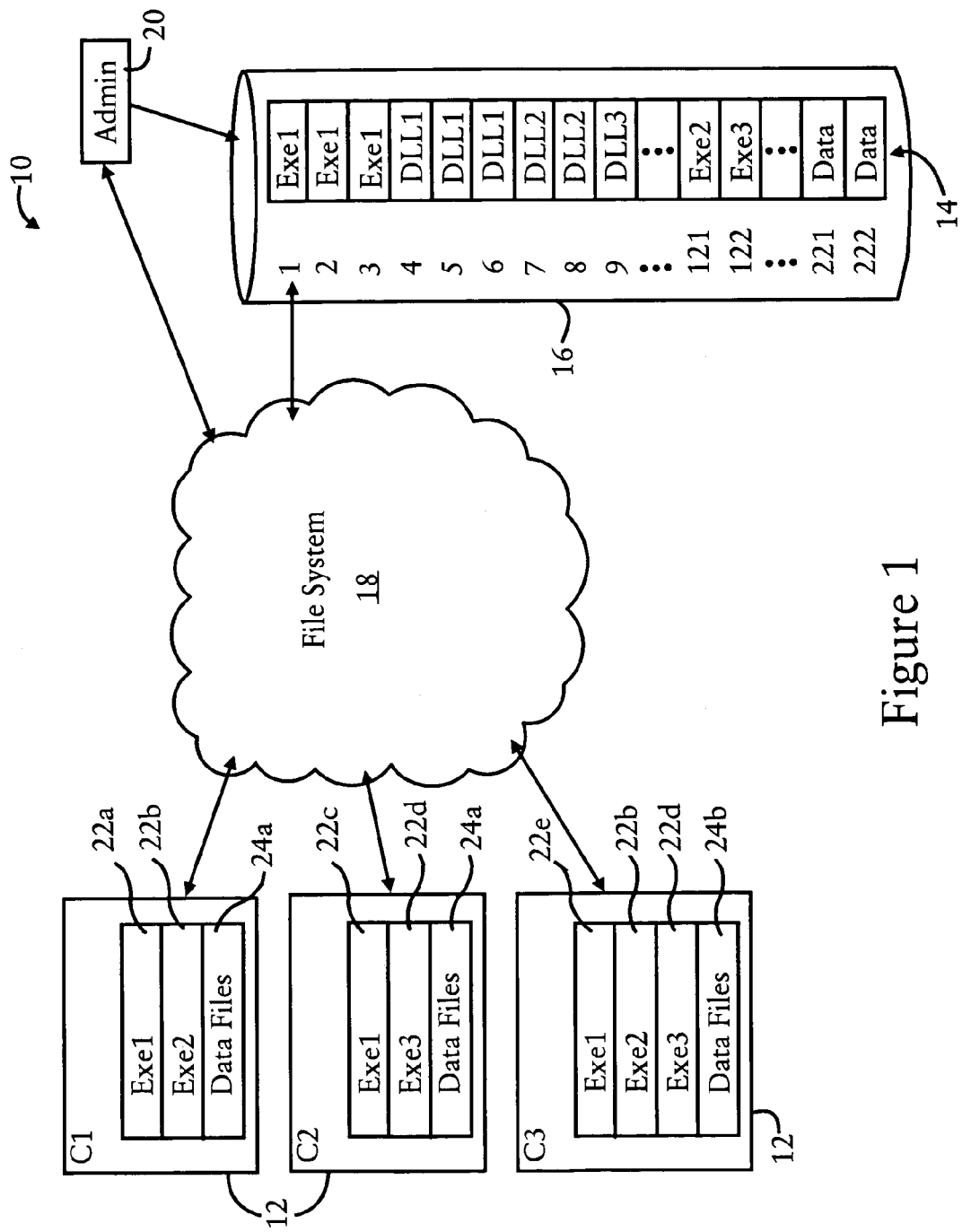
FIG. 1 is a diagram illustrating a network having a file system configured for supplying selected versions of files to clients based on detection of related files opened by the clients, according to an embodiment of the present invention.

FIG. 1 is a diagram illustrating a network 10 configured for providing services to clients (e.g., C1, C2, C3) 12 coupled to the network, according to an embodiment of the present invention. The network 10 includes a file system 18 configured for providing file services, including providing requested files 14 requested from the clients 12 from at least one storage medium 16. The file system 18 and the files 14 within the storage medium 16 are managed by an administrator 20 that manages the data files 14 and the file system 18, described below.

Although FIG. 1 illustrates only a single file system 18, and a single storage medium 16, it will be readily appreciated that the disclosed network 10 can be deployed utilizing a distributed architecture, where the files 14 within the storage medium 16 can be replicated among multiple storage nodes, and the file system 18 can be implemented using multiple computing nodes that participate in providing the services of the file system 18. Additional details related to replicating the files 14 among multiple storage nodes are described in commonly-assigned, copending application Ser. No. 10/859,209, filed Jun. 3, 2004, entitled "ARRANGEMENT IN A NETWORK NODE FOR SECURE STORAGE AND RETRIEVAL OF ENCODED DATA DISTRIBUTED AMONG MULTIPLE NETWORK NODES", the disclosure of which is incorporated in its entirety herein by reference. Additional details related to implementing the file system 18 using a distributed architecture are described and commonly-assigned, copending application Ser. No. 11/053,954, filed Feb. 10, 2005, entitled "DISTRIBUTED COMPUTING BASED ON MULTIPLE NODES WITH DETERMINED CAPACITY SELECTIVELY JOINING RESOURCE GROUPS HAVING RESOURCE REQUIREMENTS", the disclosure of which is incorporated in its entirety herein by reference.

The file system 18 is configured for supporting multiple versions of files, namely maintaining different versions of a given file stored in the storage medium 16. In particular, the storage medium 16 is configured for storing multiple files 14, where at least some of the files have multiple versions, illustrated by the identical file name being stored at multiple locations. Note that the file system 18 need not necessarily be a versioning file system as used in the prior art; rather, the file system 18 merely needs to act as the sole manager for access to files requiring version-based control within the file system; hence, the file system 18 can be separate from the files 14 stored and the data store 16, and act as a mediator between the clients 12 and the data stored in the data store 16.

The storage medium 16 stores application components "Exe1", "DLL1", "DLL2", "DLL3", Exe2", and "Exe3", and at least one data file "Data". As illustrated in FIG. 1, the storage medium 16 stores multiple versions of the application component "Exe1" at respective locations "1", "2", "3", multiple versions of the application component "DLL1" at respective locations "4", "5", "6", multiple versions of the application component "DLL2" at respective locations "7", "8"; the storage medium 16 also stores multiple versions of the data file "Data" at respective locations "221" and "222". Also note that the storage medium 16 stores a single version of the application components "DLL3" at location "9", "Exe2" at location "121", and "Exe3" at location "122".

As described below in detail with respect to FIGS. 2 and 3, the file system 18 is configured for providing selected files 14 to each of the clients 12, based on: (1) whether the client has requested a file 14 that has multiple versions (e.g., "Exe1"), (2) whether the requested file is associated with (i.e., has an identified relationship with) other version-based files 14 on the storage medium 16, and (3) and whether the client 12 has already opened another file 14 having an identified relationship with the request of file.

Hence, version-based files 14 are selectively supplied to the clients 12 based on client context, namely based on whether a given client 12 has already opened another file having an identified relationship with the requested file. As illustrated in FIG. 1, the first client (C1) 12 has loaded into its internal memory an executable application instance 22*a* of a first application ("Exe1") based on retrieval of an application component "Exe1" 14, an executable application instance 22*b* of a second application ("Exe2") based on retrieval of the application component "Exe2" 14, and the data file 24*a* based on retrieval of the data file "Data" 14. As described below, assume the executable application instance 22*a* is created based on the client (C1) 12 opening the application component "Exe1" 14 having been obtained by the file system 18 from the address location "1". Assume also that the client (C1) 12 opened the data file 24*a* based on receiving from the file system 18 the data file "Data" 14 stored at location "221".

Assume that following the instantiation of the executable application instance 22*a* by the client (C1) 12, the administrator 20 adds a new version of the application component "Exe1" 14 at address location "2" and updates the file system 18 to identify the new version of the application component "Exe1" 14 at storage location "2". The second client (C2) sends its request for the application component "Exe1" 14 following the addition of the new version at address location "2". Hence, the second client (C2) 12 has loaded into its internal memory an executable application instance 22*c* of the first application ("Exe1") based on retrieval of the application component "Exe1" 14, an executable application instance 22*d* of a third application ("Exe3") based on retrieval of an application component "Exe3" 14, and the data file 24*a* based on retrieval of the data file "Data" 14. In this case, the file system 18 provides the client (C2) 12 the most recent version of the application component "Exe1" 14 at storage location "2", and the data file "Data" stored at location "221".

Assume further that following the instantiation of the executable application instances 22*a* and 22*c* by the clients (C1) and (C2) 12, respectively, the administrator 20 adds a new version of the application component "Exe1" 14 at storage location "3", and updates the file system 18 accordingly. In this case, the third client (C3) 12 receives the application component "Exe1" 14 based on retrieval by the file system 18 from the storage location "3". Hence, the third client (C3) 12 has loaded into its internal memory an executable application instance 22*e* of the first application ("Exe1") based on retrieval by the file system 18 of the application component "Exe1" 14 from the storage location "3".

Hence, the application instances 22*a*, 22*c*, and 22*e* of the application component "Exe1" executed by the respective clients C1, C2, and C3 are distinct in that each client is executing a corresponding version of the executable application that includes the application component "Exe1". Note, however, that the client C3 executes the same application instance 22*b* and 22*d* of the executable applications including respective application components "Exe2" and "Exe3" as clients C1 and C2, respectively. In addition, the data file 24*b* loaded into the memory of the third client (C3) is based on retrieval by the file system 18 of the data file "Data" from the storage location "222".

Hence, the clients C1, C2, and C3 are concurrently executing respective application instances 22*a*, 22*c*, and 22*e* of the same executable application based on respective versions of the same application component "Exe1" from respective locations "1", "2", "3". As apparent from the foregoing, the file system 18 needs to ensure that each of the clients 12 receive the appropriate application components (e.g., DLL1, DLL2, DLL3) based on the corresponding version of the executable application. In addition, it is highly desirable that once a given application instance 22 is terminated, that a client 12 will receive the most recent version of a file 14 during the next file access.

Hence, the file system 18 supplies a selected file 14 to a requesting client based on determining whether the client 12 has already opened a second file having an identified relationship with the requested file.

Figure 2:
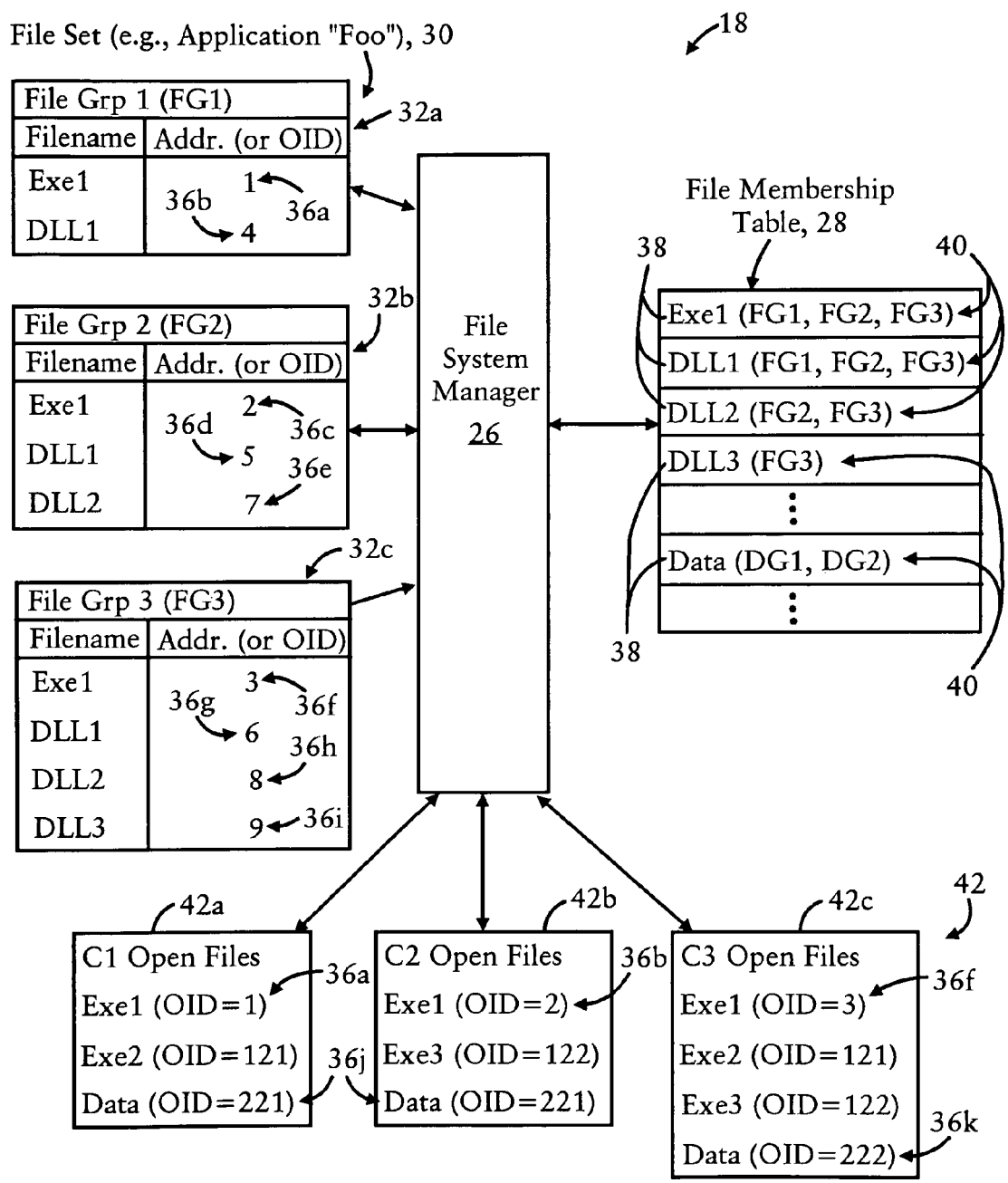
FIG. 2 is a diagram illustrating in detail the file system of FIG. 1.

FIG. 2 is a diagram illustrating in further detail the file system 18, according to an embodiment of the present invention. The file system 18 includes a file system manager 26, a file membership table 28, and for each collection of linked files (e.g., an executable application) a file set 30 having at least one file group 32; as illustrated in FIG. 2, the file set 30 includes the file groups FG1 32*a*, FG2 32*b*, and FG 32*c*, where each file group 32 is used to identify a corresponding version of the file set 30.

In particular, the disclosed embodiment utilizes file groups 32, also referred to herein as catalog files, in order to identify the files 14 that belong to a given version of a file set 30. In other words, the file set 30 identifies all files that fall within the collection of a given service object, for example an executable application (e.g., "Foo") or a collection ("Data") of linked data files, regardless of the version of the files. Each file group 32 of the file set 30 identifies specific files 14 that are associated with a corresponding version of the file set 30. Hence, each catalog file 32a, 32b, 32c specifies the files (e.g., application components) for a corresponding version of a file set (e.g., an executable application) 30.

For example, if the file set 30 represents the collection of all available versions of the executable application "Foo", then the file group 32a can represent the files (e.g., application components) needed for execution of the first version (v1) of the executable application "Foo": note that files 14 that are associated with an executable application (e.g., "Exe1", "DLL1", "DLL2", "DLL3") are specifically referred to as application components as a specific subset of the more generic term "file"; hence, the term "file" as used herein includes both application components and data files (e.g., word processing documents, spreadsheet documents, etc.) used in a collection of linked data files (e.g., "Data").

In addition, each file group 32 identifies only one version of each file specified in that corresponding file group, such that only one version of a given file can be identified in any file group 32. For example, the file group FG1 32a has only one identifier 36a for the version of the file "Exe1", wherein that identifier 36a identifies the specific version of the file "Exe1" to be used, in this example the copy of the file "Exe1" stored at location "1" in the storage medium 16; similarly, the file group FG1 32a has only one identifier 36b for the version of the file "DLL1", wherein that identifier 36b identifies the specific version of the file "DLL1" to be used, in this example the copy of the file "DLL1" stored at location "4" in the storage medium 16. Hence, each of the files "Exe1" and "DLL1" identified by the file group 32a have an identified relationship relative to the version (FG1) of the file set 30.

Similarly, the file group FG2 32b identifies only one version "2" 36c, "5" 36d, and "7" 36e of each file "Exe1", "DLL1", "DLL2" specified in the corresponding file group FG 32b. Consequently, each of the files "Exe1", "DLL1" and "DLL2" identified by the file group 32b have an identified relationship relative to the version (FG2) of the file set 30. In the same manner, the FG2 32c identifies only one version "3" 36f, "6" 36g, "8" 36h, and "9" 36i of each file "Exe1", "DLL1", "DLL2", "DLL3" specified in the corresponding file group FG 32c. Consequently, each of the files "Exe1", "DLL1", "DLL2" and "DLL3" identified by the file group 32c have an identified relationship relative to the version (FG3) of the file set 30. The file set 30 and the associated file groups 32 for the data file "Data" are omitted to simplify the description herein, although it will be recognized that the file system manager 26 also will include such structures for the data file.

Hence, the administrator 20 of FIG. 1 utilizes the file system manager 26 to create a new file group 32 for each new version of a given file set 30. Hence, the administrator 20 will initially deploy the file set 30 (e.g., the application "Foo") based on storing the initial application components "Exe1" and "DLL1" at the storage locations "1" and "2" in the storage medium 16, and creating the file group 32a that identifies the initial version (FG1) of the application "Foo". For each subsequent version within the file set 30 (e.g., FG2, FG3), the administrator 20 will utilize the file system 18 to create a corresponding file group 32 (e.g., 32b, 32c) that identifies the versions of application components that should be used for the associated version within the file set 30. Hence, the file system manager 26 can identify the files that should be supplied to a client for any given version.

The file system 18 also is able to keep track of different versions executed by the clients, without the necessity of providing any version information either by the client 12, or within the file 14 that is supplied to the client. In particular, the file membership table 28 within the file system 18 includes entries 38 that specify the available files 14 (e.g., application components) for any of the versions of the file set (e.g., executable application) 30. In particular, each entry 38 (e.g., for "DLL2") specifies the file groups (e.g., FG2, FG3) to which the corresponding identified file ("DLL2") belongs, enabling the file system manager 26 to identify the file groups 32b, 32c that include the requested file "DLL2" as a member. Hence, the file membership table 28 specifies for each file 14 having multiple versions a corresponding list 40 of the catalog files 32 that reference the file. Hence, the file system manager 26 is able to identify whether a requested file belongs to any of the file groups 32.

The file system manager 26 also maintains, for each client 12, a corresponding entry 42 that specifies the versions of the files having been opened by the client. For example, the client entry 42a for the client "C1" specifies the version 36a of the application component "Exe1" in use by the client "C1" for execution of the application instance 22a; similarly, the client entries 42b and 42c specify that the clients "C2" and "C3" have opened the versions 36b and 36f of the application "Exe1" for execution of the application instances 22c and 22e, respectively. Also note that the client entries 42 identify the version 36j or 36k having been opened of the data file "Data".

The file system manager 26 also is configured for removing from the entry 42 an identifier (e.g., 36a) that identifies a given version of a file having previously been opened by the client, in response to detecting that the client has closed the identified file. Hence, the file system manager 26 can keep track of the files having been opened by the clients 42 to ensure that any new requested file is selected based on any identified relation between opened files.

As illustrated in FIG. 2, each version 36 of a given file 14 is illustrated as being identified by a corresponding storage location of the specific file. However, the identifier 36 for a specific version of a file, for example the file "Exe1" at storage location "1", alternately may be implemented as a unique object identifier (OID) that uniquely identifies the corresponding file independent of any file attribute, including storage location. Hence, the identifiers 36 illustrated in FIGS. 1 and 2 may be implemented as unique object identifiers that uniquely identify a corresponding file, regardless of the storage location. Use of unique object identifiers for identification of specific versions of files, as opposed to storage locations, enables the data files 14 to be replicated in a distributed storage system, where any one of the replicas may be accessed based on the corresponding OID.

Additional details related to providing a unique object identifier (OID) for identification of files in a distributed file service is described in commonly-assigned, copending application Ser. No. 11/051,333, filed Feb. 7, 2005, entitled "ARRANGEMENT FOR A DISTRIBUTED FLE SYSTEM HAVING DATA OBJECTS MAPPED INDEPENDENT OF ANY DATA OBJECT ATTRIBUTE", the disclosure of which is incorporated in its entirety herein by reference. In summary, each file of a distributed file system is identified by a corresponding globally-unique object identifier (OID) that is independent of any attribute of the file. The distributed file system includes a plurality of directory entries, where each directory entry has a file name field, an attributes field, and an object identifier field configured for specifying a globally-unique object identifier. The globally-unique object identifier is universally reachable by any computing node of the distributed file system and uniquely identifies the data file, enabling the file to be universally identifiable by any node based on the corresponding object identifier. The file can be stored independently of a device file system based on providing a resolution between the file name and its object identifier, followed by a resolution between the object identifier and a selected location for the file. Hence, the version of a file, regardless of whether the file is a data file or an executable file, can be identified based on the corresponding OID, where files assigned to a given file group are identified by their respective OIDs.

Figure 3:
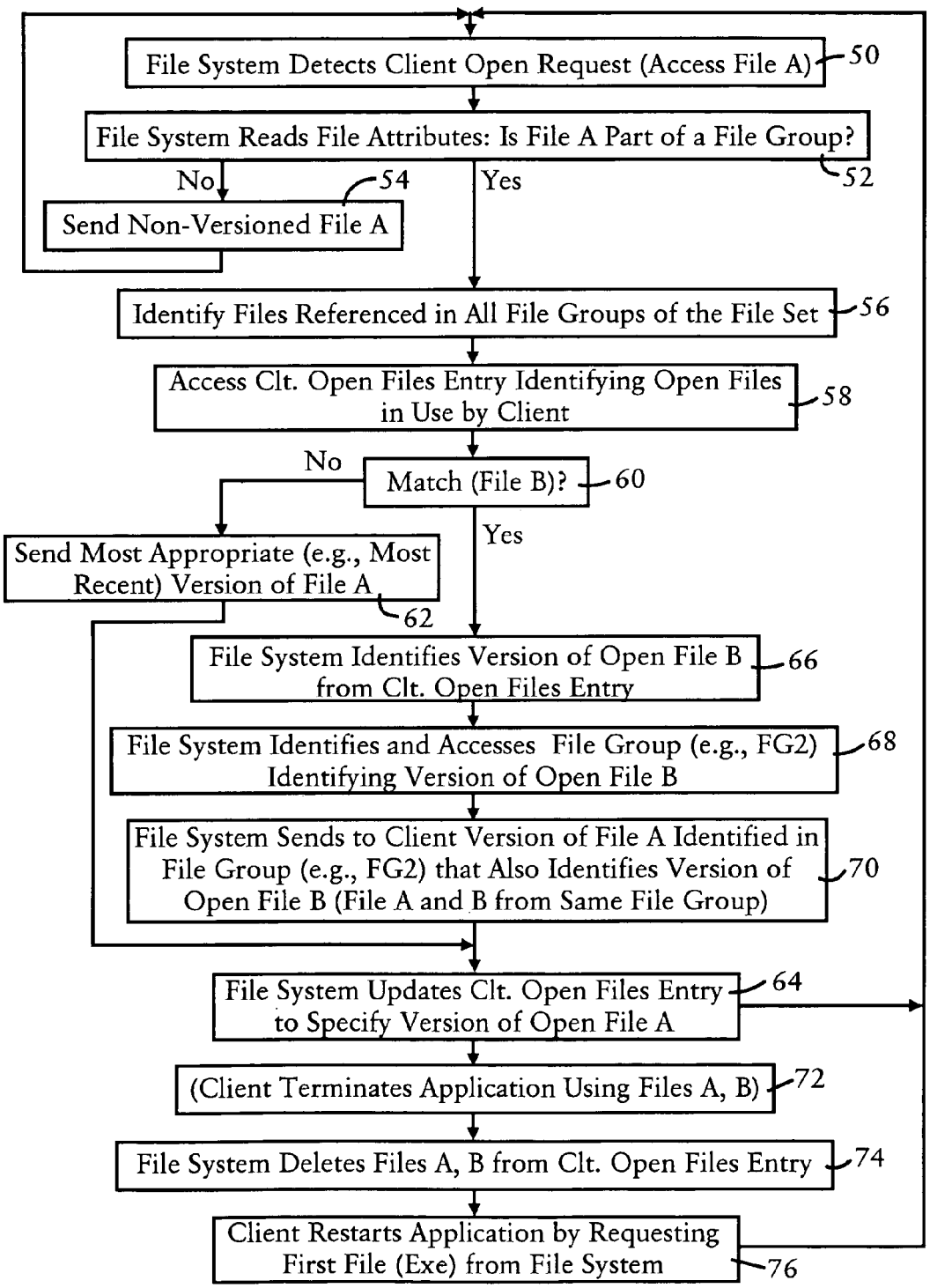
FIG. 3 is a diagram illustrating the method of supplying selected versions of files to clients based on detecting related files opened by the clients, according to an embodiment of the present invention.

FIG. 3 is a diagram illustrating the method of supplying selected versions of files to clients based on detecting related files opened by the clients, according to an embodiment of the present invention. The steps described herein can be implemented in each network node as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 50, where the file system manager 26 of the file system 18 detects a request from a client (e.g., C1) to open a file 14, illustrated as File A. As described above, each client initiates an executable application instance 22 based on retrieval of each of the application components from the storage medium 16 by the file system 18.

The file system manager 26 reads in step 52 the file attributes of the requested file 14 based on accessing the corresponding entry 38 in the file membership table 28: if in step 52 the file system manager 26 determines that the requested file is not part of a file group 32, indicating that the requested file does not have any version control imposed by the administrator 20, the file system manager 26 sends the non-versioned file to the client in step 54 without any further action.

If in step 52 the file system manager 26 determines that the requested file belongs to at least one file group 32, a file system manager 26 identifies in step 56 all of the files that belong to file groups 32 specified in the corresponding list 40 for the file entry 38. For example, if the requested file (File A) is the application component "DLL1" (File A="DLL1"), the file system manager 26 identifies that the application component "DLL1" belongs to the file groups FG1 32a, FG2 32b, and FG3 32c; hence, the file manager 26 reads each of the file groups 32a, 32b, 32c specified in the corresponding list 40 to identify the files "Exel", "DLL1", "DLL2", and "DLL3". In addition, the file system manager accesses in step 58 the corresponding client open files entry 42 (e.g., 42a) for the corresponding client (e.g., "C1") having sent to the request to identify any files having been previously opened and that are in use by the client. As illustrated in FIG. 2, the file system manager 26 can identify that the client "C1"12 has previously opened the files "Exel", "Exe2", and "Data".

If in step 60 the file system manager 26 determines that there is no match between the first collection of files belonging to any one of the file groups 32a, 32b, or 32c and the second collection of open files specified in the client open files entry 42 (e.g., assuming the file "Exel" was absent from the client open files entry 42a for the client "C1"), the file system manager 26 sends in step 62 the most appropriate version of the requested data file to the requesting client. As described above, the most appropriate file depends on the context of the requesting client 12, the file being requested, and any other network attributes, for example network traffic, loading, etc. In the case of the client 12 initiating a new executable application instance 22a, the file system manager 26 is configured for sending in step 62 the most recent version of the application component "Exel", and updating in step 64 the corresponding client open files entry 42a to specify the specific version 36 of the open file utilized by the requesting client 12.

Assuming in step 60 that the file system manager 26 detects a match between the first collection of files belonging to any one of the file groups 32a, 32b, or 32c and the second collection of open files specified in the client open files entry 42 (e.g., assuming the file "Exel" is present in the client open files entry 42a for the client "C1" as illustrated in FIG. 2), the file system manager 26 identifies in step 66 the version of the matched open file (e.g., File B="Exel") from the corresponding client open files entry 42 for the requesting client 12. Hence, the file system manager 26 would identify the version of the executable application component "Exel" for the clients "C1", "C2" and "C3" as version 36a, 36b, and 36f based on the entries 42a, 42b, and 42c, respectively.

In response to identifying the version of the open file (e.g., File B="Exel") having an identified relationship with the requested file (e.g., File A="DLL1"), the file system manager 26 identifies in step 68 the one file group 32 that identifies the version of the open file (e.g., File B="Exel"). Hence, the file system manager 26 would identify the file group 32a as identifying (owning) the version 36a of the open file "Exel" in use by the client "C1"; the file system manager 26 would identify the file group 32b as identifying (owning) the version 36b of the open file "Exel" in use by the client "C2"; and the file system manager 26 would identify the file group 32c as identifying (owning) the version 36f of the open file "Exel" in use by the client "C3". The file system manager 26 sends in step 70 to the requesting client "C1", "C2", or "C3" the version 36b, 36d, or 36g of the requested file (File A="DLL1") 14 having been identified in the file group 32a, 32b, or 32c that owns the version 36a, 36b, or 36f of the open file (File B="Exel"), respectively. The file system manager then updates in step 64 the appropriate client open files entry 42 to specify the version of the open file, as described above.

As described above, the file system manager 26 is configured for maintaining the client open files entries 42, including adding version identifiers 36 as described with respect to step 64, and removing identifiers. For example, if in step 72 one of the clients (e.g., "C1") 12 terminates its application instance (e.g., 22a) of the executable application "Foo" 30, the file system manager 26 detects the termination of the application instance 22, and in response deletes the identifiers 36 from the client open files entry 42 in step 74.

Hence, if the client device 12 initiates the executable application 30 following termination of the prior instance 22 in step 72, the client 12 restarts the application instance 22 for the application 30 by requesting in step 76 the application components (e.g., "Exel") from the file system 18. As described above, the file system manager 26 will determine that no related files are in use by the client in step 60, and will therefore send in step 62 the most recent version of the application component, enabling the client 12 to immediately obtain the most recent version of the executable application 30.

According to the disclosed embodiment, newly created versions of existing files may be added to a network and provided immediately to clients requesting access, while ensuring that no incompatibilities are introduced with prior versions that may be in use by the clients. Further, version control is implemented in a manner that is transparent to the clients 12, and without the necessity of any version identifier within the actual files 14. Hence, network administrators can easily upgrade data files or executable applications simply by adding the new files to network storage, and creating a new file group that identifies the new files associated with the new version.

Although the disclosed embodiment illustrates that the different versions of a data file specified in the respective file groups have distinct version identifiers, it will be readily appreciated that unchanged files can use the same version identifier among different file groups, as long as the unchanged files are subordinate to (i.e., accessed after) a primary file having unique version identifiers for the respective file groups, ensuring that the file group ownership (of the files utilized by the client) can be uniquely identified.

In addition, although the disclosed embodiment described the file membership table, the client open files entries, and the file groups as within the file system, it will be appreciated that these data structures can be stored external to the file system (e.g., external database or RAM) for tracking of catalogs, versions, and client bindings.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network having a file system, the method comprising:
    receiving by the file system a request for a first file from a client;
    determining by the file system whether the client has opened and is currently using a second file having an identified relationship with the first file based on accessing a data structure distinct from the request and identifying files currently in use by the corresponding client;
    selectively determining by the file system a version of the second file opened by the client, based on determining the client has opened and is currently using the second file;
    selectively identifying by the file system one of a plurality of file groups that identifies the determined version of the second file, each file group identifying only one version of each file specified in the corresponding file group, the files identified by said each file group having an identified relationship relative to a corresponding version of a file set; and
    selectively sending to the client by the file system a version of the first file having been identified in the one identified file group, in response to the request and based on determining the client has opened and is currently using said second file having said identified relationship with the first file.

2. The method of claim 1, wherein the determining includes:
    first identifying whether the first file is identified as belonging to any file groups;
    in response to determining the first file is identified as belonging to at least a first of said any file groups, identifying a first plurality of files belonging to said at least a first of said any file groups; and
    second identifying the second file based on identifying a match from comparing the first plurality of files to the files currently in use by the client.

3. The method of claim 2, wherein the data structure is an entry that specifies the respective versions of the files currently in use by the client, the method further comprising:
    adding to the entry a first identifier identifying the version of the first file in response to sending the version of the first file having been identified in the one identified file group; and
    removing from the entry a second identifier identifying a version of a third file of the files currently in use by the client, in response to detecting the client having closed the third file.

4. The method of claim 2, wherein the first identifying includes accessing an entry for the first file, the entry configured for identifying said any file groups to which the first file belongs.

5. The method of claim 1, wherein the selectively determining, the selectively identifying, and the selectively sending the version of the first file, each are based on the file system having determined that the client has opened the second file having the identified relationship with the first file, the method further comprising:
    n response to determining an absence of the second file:
    (1) sending a most recent version of the first file to the client; and
    (2) adding to an entry of the data structure a first identifier specifying the most recent version of the first file in use by the client.

6. The method of claim 5, further comprising removing from the entry a second identifier identifying a version of a third file having been opened by the client, in response to detecting the client has closed the third file.

7. The method of claim 6, wherein at least one of the first, second or third files is implemented as an application component, each file group identifying the corresponding version of an executable application as said file set.

8. The method of claim 7, further comprising:
    in the client:
    terminating the executable application; and
    following said terminating of the executable application, initiating the executable application on the client based on sending to the file system a second request for one of the files associated with the executable application;
    in the file system, sending a most recent version of the one file based on a determined absence of any file having an identified relationship with the one file.

9. The method of claim 1, wherein at least one of the first file or the second file is implemented as an application component, each file group identifying the corresponding version of an executable application as said file set.

10. A network comprising:
    a storage medium configured for storing a plurality of files, at least one of the files having a plurality of versions; and
    a file system configured for receiving a request for a first file from a client, the file system configured for responding to the request based on:
    (1) determining whether the client has opened and is currently using a second file having an identified relationship with the first file based on accessing a data structure distinct from the request and identifying files currently in use by the corresponding client, and in response determining a version of the second file opened by and in use by the client, based on determining the client has opened and is currently using the second file, and
    (2) identifying one of a plurality of file groups that identifies the determined version of the second file, each file group identifying only one version of each file specified in the corresponding file group, the files identified by said each file group having an identified relationship relative to a corresponding version of a file set;

the file system sending to the client a version of the first file having been identified in the one identified file group.

11. The network of claim 10, wherein the file system is configured for determining whether the client has opened said second data file based on:

first identifying whether the first file is identified as belonging to any file groups;

in response to determining the first file is identified as belonging to at least a first of said any file groups, identifying a first plurality of files belonging to said at least a first of said any file groups; and second identifying the second file based on identifying a match from comparing the first plurality of files to the files currently in use by the client.

12. The network of claim 11, wherein the file system is configured for determining the version of the second file opened by and in use by the client based on accessing the data structure, implemented as an entry that specifies the respective versions of the files currently in use by the client, the file system further configured for:

adding to the entry a first identifier identifying the version of the first file in response to sending to the client the version of the first file having been identified in the one identified file group; and removing from the entry a second identifier identifying a version of a third file of the files currently in use by the client, in response to detecting the client having closed the third file.

13. The network of claim 11, wherein the file system includes an entry for the first file in the file system, the entry configured for identifying said any file groups to which the first file belongs, the file system configured for identifying said at least a first of said any file groups based on accessing said entry for the first file.

14. The network of claim 10, wherein in response to the file system determining an absence of the second file, the file system is configured for:

(1) sending a most recent version of the first file to the client; and (2) adding to an entry of the data structure a first identifier specifying the most recent version of the first file in use by the client.

15. The network of claim 14, wherein the file system is configured for removing from the entry a second identifier identifying a version of a third file having been opened by the client, in response to detecting the client has closed the third file.

16. The network of claim 15, wherein at least one of the first, second or third files is implemented as an application component, each file group identifying the corresponding version of an executable application as said file set.

17. The network of claim 10, wherein at least one of the first file or the second file is implemented as an application component, each file group identifying the corresponding version of an executable application as said file set.

18. A network comprising:

storage means for storing a plurality of files, at least one of the files having a plurality of versions; and file system means for responding to a request from a client for a first file, the file system means configured for responding to the request based on:

(1) determining whether the client has opened and is currently using a second file having an identified relationship with the first file based on accessing a data structure distinct from the request and identifying files currently in use by the corresponding client, and in response determining a version of the second file opened by and in use by the client, based on determining the client has opened and is currently using the second file, and (2) identifying one of a plurality of file groups that identifies the determined version of the second file, each file group identifying only one version of each file specified in the corresponding file group, the files identified by said each file group having an identified relationship relative to a corresponding version of a file set;

the file system means further configured for sending to the client a version of the first file having been identified in the one identified file group.

19. The network of claim 18, wherein the file system means is configured for determining whether the client has opened said second data file based on:

first identifying whether the first file is identified as belonging to any file groups;

in response to determining the first file is identified as belonging to at least a first of said any file groups, identifying a first plurality of files belonging to said at least a first of said any file groups; and second identifying the second file based on identifying a match from comparing the first plurality of files to the files currently in use by the client.

20. The network of claim 19, wherein the file system means is configured for determining the version of the second file opened by and in use by the client based on accessing the data structure implemented as an entry that specifies the respective versions of the files currently in use by the client, the file system means further configured for:

adding to the entry a first identifier identifying the version of the first file in response to sending to the client the version of the first file having been identified in the one identified file group; and removing from the entry a second identifier identifying a version of a third file of the files currently in use by the client, in response to detecting the client having closed the third file.

21. The network of claim 19, wherein the file system means includes an entry for the first file in the file system means, the entry configured for identifying said any file groups to which the first file belongs, the file system means configured for identifying said at least a first of said any file groups based on accessing said entry for the first file.

22. The network of claim 18, wherein in response to the file system means determining an absence of the second file, the file system means is configured for:

(1) sending a most recent version of the first file to the client; and (2) adding to an entry of the data structure a first identifier specifying the most recent version of the first file in use by the client.

23. The network of claim 22, wherein the file system means is configured for removing from the entry a second identifier identifying a version of a third file having been opened by the client, in response to detecting the client has closed the third file.

24. The network of claim 23, wherein at least one of the first, second or third files is implemented as an application component, each file group identifying the corresponding version of an executable application as said file set.

25. The network of claim 18, wherein at least one of the first file or the second file is implemented as an application component, each file group identifying the corresponding version of an executable application as said file set.

* * * * *